(No Model.)

J. H. C. TURNER.
ANIMAL TETHER.

No. 244,952.                    Patented July 26, 1881.

Witnesses:
W. S. D. Haines
J. W. Garner

Inventor:
J. H. C. Turner.
By H. J. Ennis
Atty.

UNITED STATES PATENT OFFICE.

JOHN H. C. TURNER, OF JOHNSTON'S DEPOT, SOUTH CAROLINA.

ANIMAL-TETHER.

SPECIFICATION forming part of Letters Patent No. 244,952, dated July 26, 1881.

Application filed February 4, 1881. (No model.)

*To all whom it may concern:*

Be it known that I, JOHN H. C. TURNER, a citizen of the United States, residing at Johnston's Depot, in the county of Edgefield and State of South Carolina, have invented certain new and useful Improvements in Animal-Tethers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to a grazing-halter; and the novelty consists in the construction and arrangement of parts, as will be more fully hereinafter set forth, and specifically pointed out in the claims.

The object of the invention is to provide a halter which will prevent a horse from jumping even the most ordinary fence, and also to allow a horse to graze in a corn or grain field without his being able to consume the grain.

The device is applicable to horses, mules, or cattle, is not liable to injure the animal, and may be adjusted to fit animals of various sizes, and the head of any animal may be secured high or low, to suit the crops to be protected.

The device may be employed in various capacities where a headstall is useful, and may be of great service in breaking colts, managing or training vicious horses from running away, or the like.

Figure 1:
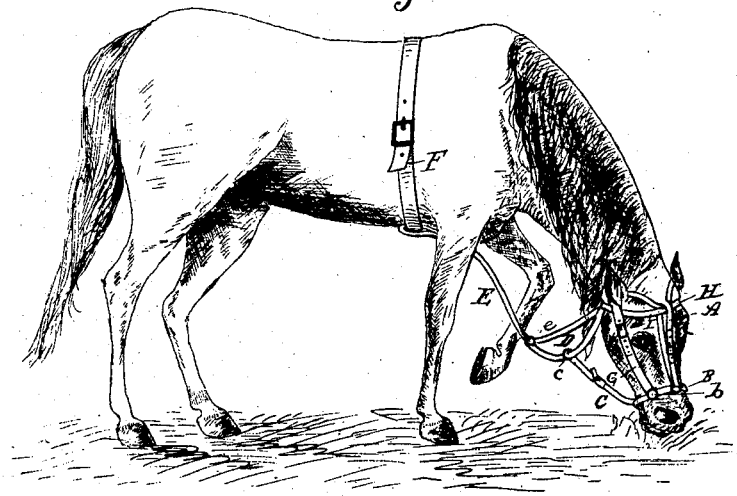
Figure 2:
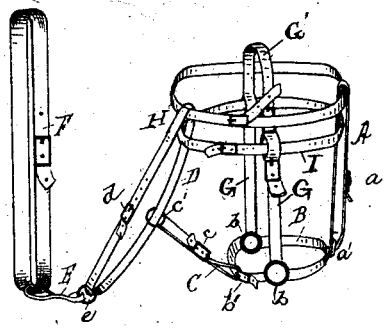

In the accompanying drawings, which form a part of this specification, Figure 1 is a side elevation of my invention, and Fig. 2 a detached view of the device.

To enable others skilled in the art to make and use the device, I will now describe its construction and mode of operation, reference being had to the said figures of the drawings, in which—

A represents the face-strap, having a nose-bearing plate, $a$, provided with a take-up buckle, $a'$, and secured by proper rings, $b$, to a nose-strap, B, formed of three pieces, the rear piece having a buckle, $b'$, and operating within the rings $b$. From this rear piece of the nose-strap a loop, C, having a buckle, $c$, and a ring, $c'$, connects with a strap, D, having buckle $d$, said strap passing through a ring, $e$, upon a link, E, which passes between the fore legs of the animal and receives the surcingle F.

From the side rings, $b$, of the nose-strap extend backwardly the check-straps G, which terminate in the strap G' and receive the neck-strap H, which bears upon the head of the animal forward of the ears and through the strap D, as shown.

It is well known that a horse dislikes to have his ears constantly pressed or interfered with, and I provide an ear-strap, I, which, passing through the face-strap A and downwardly behind the ears, connects with the strap D. This strap I is longer than the throat-strap, and rests easily upon the animal while grazing; but when the animal seeks to raise his head to bite or eat the grain the strap pinches the ears of the animal between it and the throat-strap and induces him to desist. The tie-strap allows the head of the animal to be held down to any desired extent and effectually prevents jumping.

What I claim as new, and desire to secure by Letters Patent, is—

1. The combination of the headstall A B $b$ G G', as shown, with the tie-strap D $d$, links C and E, and the surcingle F, as and for the purposes specified.

2. The ear-strap I, combined with throat-strap H, tie-strap D $d$, and surcingle, as and for the purpose herein set forth.

In testimony whereof I affix my signature in presence of two witnesses.

J. H. C. TURNER.

Witnesses:
J. W. CALHOUN,
JNO. KENNEDY.